United States Patent [19]

Muller et al.

[11] Patent Number: 4,802,203
[45] Date of Patent: Jan. 31, 1989

[54] TELEPHONE MESSAGE RECORDING DEVICE WITH DISPLAYS TO INDICATE THE NUMBER OF CALLS RECEIVED AND MESSAGES RECORDED

[75] Inventors: Willy Muller, Guggerstrasse 13, CH-8702 Zollikon, West Zollekon, Fed. Rep. of Germany; Marcus Moser, Fleet, England

[73] Assignee: Willy Muller, Zollikon, Fed. Rep. of Germany

[21] Appl. No.: 105,530

[22] Filed: Sep. 30, 1987

Related U.S. Application Data

[63] Continuation of Ser. No. 848,286, Apr. 4, 1986, abandoned.

[30] Foreign Application Priority Data

Apr. 4, 1985 [EP] European Pat. Off. ........ 85104135.0

[51] Int. Cl.$^4$ ............................................. H04M 1/65
[52] U.S. Cl. ...................................................... 379/80
[58] Field of Search ....................... 379/70, 74, 77, 80, 379/81; 340/762; 369/25

[56] References Cited

U.S. PATENT DOCUMENTS 3,937,893 2/1976 Muller et al. .......................... 379/81
4,302,630 11/1981 Ingegnoli et al. ..................... 379/80
4,309,571 1/1982 Chamberlin ............................ 369/25

FOREIGN PATENT DOCUMENTS 60-10860 1/1985 Japan ..................................... 379/80

OTHER PUBLICATIONS

Bringol, *Functional VOR for Telephone Recording Systems*, IBM Technical Disclosure Bulletin, vol. 17, No. 3, Aug. '74, p. 831.

Primary Examiner—Raymond F. Cardillo
Assistant Examiner—James E. Tomassini
Attorney, Agent, or Firm—Mason, Fenwick & Lawrence

[57] ABSTRACT

A telephone message recording device for recording messages from a caller on an incoming telephone line, including a recording memory for recording of calls and incoming messages, an announcement memory, a detector responsive to incoming telephone calls and producing a start signal for the announcement memory, a voice detector switch for detecting whether there are voice signals on the incoming line and supplying a start signal to the recording memory and a pair of numeric displays indicating that a call or calls have been received, one display for indicating the number of calls received and a second display for indicating the number of calls which have been recorded on the recording memory. First and second counters are provided for the displays formed by two-digit BCD counters whose output signals are applied via multiplexers and drive circuits to the associated display.

2 Claims, 1 Drawing Sheet

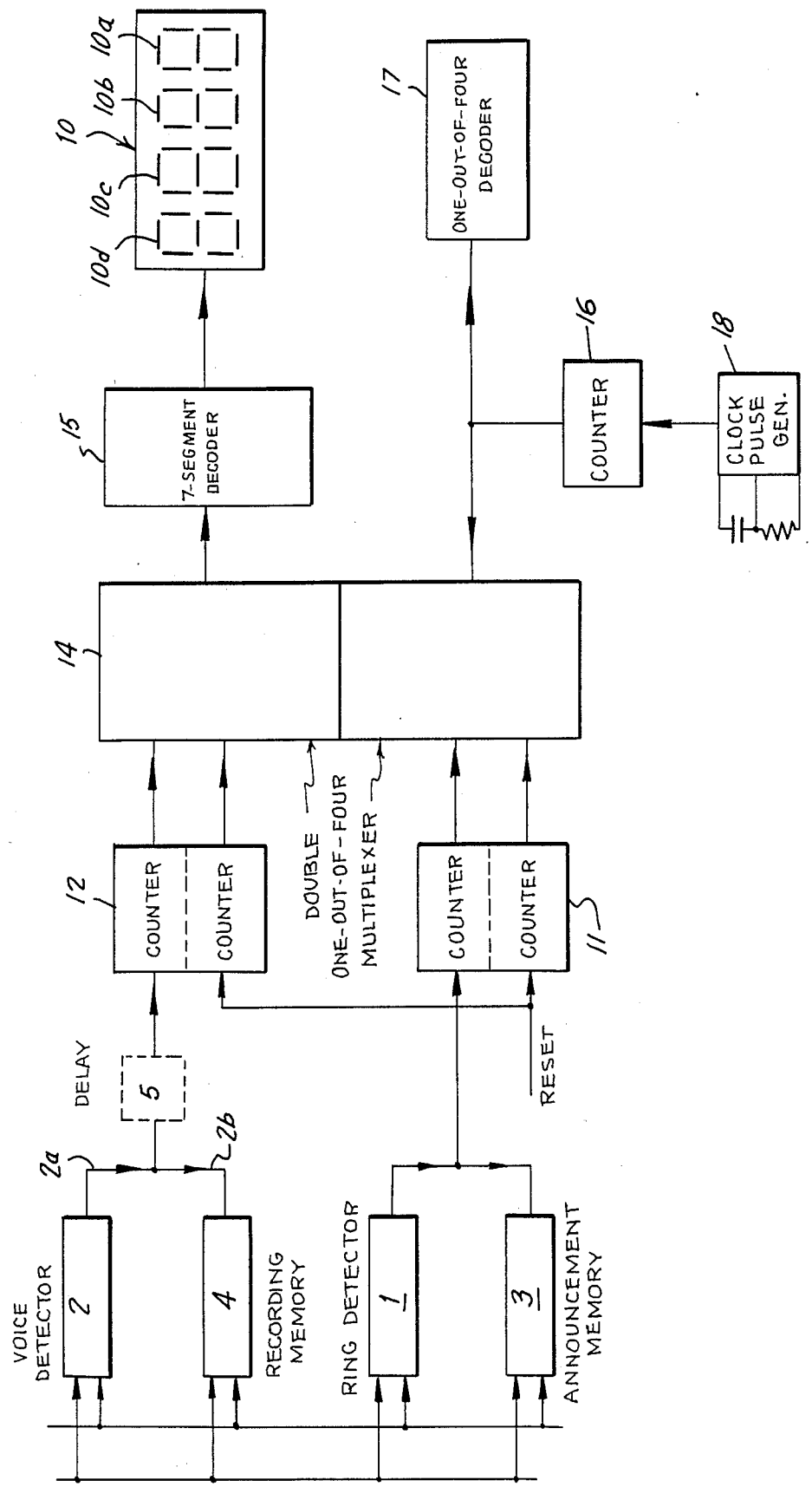

TELEPHONE MESSAGE RECORDING DEVICE WITH DISPLAYS TO INDICATE THE NUMBER OF CALLS RECEIVED AND MESSAGES RECORDED

This application is a continuation of application Ser. No. 848,286, filed 4/4/86, now abandoned.

BACKGROUND AND OBJECTS OF THE INVENTION

The present invention relates to a telephone message recording device, hereinafter frequently referred to as a answering device comprising recording means for recording of calls and incoming messages.

In a known telephone answering device as described in the U.S. Pat. No. 3,937,893, in practice display means are provided which show the operating state of the answering device. One of these display means, formed by a light source of predetermined colour, indicates whether a call has been received. The user of the telephone answering device then has the possibility of listening to the recording memory means to hear the identity of the caller and the message left by him. However, in many cases callers hang up without leaving a message. Since this is not ascertainable by the user of the answering device, he is forced in every case when the lamp indicating a received call comes on to listen to the recording memory means.

The object of the present invention is to provide a telephone answering device of this type which provides more detailed information on the nature of the calls.

According to the present invention, the telephone answering device comprises recording means for recording calls and incoming messages, a ring detector means producing a start signal for an announcement memory means, voice detector switch means for supplying a start signal to the recording memory means for recording an incoming message, and display means for indicating that a call or calls have been received, the display means including two numeric display means, of which the first indicates the number of calls and the second the number of calls which have been recorded as incoming messages on the recording memory means.

With the construction of the telephone answering device according to the invention the user can immediately determine how many callers have called during the operating time of the telephone answering set and how many of these callers have left a message which has been recorded on the recording memory means. If only calls with which no messages were recorded have been made, the user has no need to listen to the recording memory means. Further, the display of both the calls which have been made and of the calls where a message was left and recorded on the recording memory means provides an indication of the effectiveness of an announcement text and this can be of considerable significance in business.

The two numeric display means are preferably driven by two digit decimal counters which, depending on the signals available in the telephone answering device, count the start signals for the announcement memory means and the start signals for the recording memory means. The start signals are applied either via an evaluating circuit which evaluates only the start signals of the announcement memory means which are followed by a recording of a message of at least a predetermined length, or alternatively, rewind signals of the recording memory means generated in the answering device are used for decrementing the counter for the recorded calls if, in the answering device, provision is made for the recording memory means to be rewound when no message is spoken by the caller after the start signal of the recording memory means.

The output singals of the counter stages of the two counters are preferably supplied via multiplexers and associated decoders to a four-digit digital display. Provision is preferably made for the counters, the multiplexers, the decoders and a clock pulse source or a clock pulse evaluating circuit to be combined with the digital display to form a single constructional unit or a module which can be inserted as a finished unit into the answering device.

For a better understanding of the present invention, reference may be had to the accompanying drawing wherein a block circuit diagram of an embodiment of the display means of a telephone answering device is illustrated.

For further details of a known telephone answering set in which the display means according to the invention can be used, attention is drawn to already mentioned U.S. Pat. No. 3,937,893. Such a telephone answering device comprises a ring detector which detects an incoming call and furnishes a start signal to an announcement memory, for example a cassette drive, which plays back a previously recorded announcement text to the caller. Such a telephone answering set further comprises a voice detector switch which monitors an incoming call to determine whether after the end of the announcement text a message is spoken by a caller and is to be recorded by the recording memory. This voice detector switch accordingly supplies a start signal to the recording memory. If within a predetermined time after the end of the announcement text no message is spoken by the caller the recording memory is stopped and possibly rewound to the respective start point. In the latter case, a rewind signal is furnished to the recording memory.

BRIEF DESCRIPTION OF THE DRAWING

The single FIGURE of the drawing is a block diagram of the telephone answering device display means of the present invention.

DETAILED DESCRIPTION OF A PREFERRED EMBODIMENT

The block circuit diagram of the display means illustrated in the drawings comprises a four-digit numerical display 10 whose two right digits 10a, 10b indicate the total number of calls whilst the two left digits 10c, 10d indicate the number of calls where messages were left and recorded.

Accordingly, the display means comprises two counters 11, 12 which are each two-digit BCD counters whose reset inputs are connected to each other. The lower one of the counters 12 receives the start signals for the announcement memory so that said counter counts every incoming call. The upper counter of counters 12 receives the start signals of the recording memory so that this counter counts only the number of calls where a message was spoken and recorded by the recording memory.

The input circuit of the counters 11 and 12 depends on the special type of the telephone answering device.

In the block diagram, there is shown a simplified input circuit of a telephone answering device having a telephone line T with which a ring detector 1 as well as a voice detector are coupled. The ring detector detects incoming calls and provides a start signal to an announcement memory means 3 which then provides voice signals corresponding to a pre-recorded announcement or message on the telephone line to the caller. This start signal of the ring detector 1 is further fed to the up-counting input of counter 11.

After the end of the announcement message recorded on the announcement memory means 3, the voice detector switch means 2 detects whether there are voice signals on the telephone line T indicating that the caller wants to record a message on the telephone answering device. If there are voice signals detected by the voice detector switch means 2, this voice detector switch means provides a start signal on a line 2a to the recording memory means 4. This start signal also is transmitted to the up-counting input of counter 12. As indicated in dashed lines, the connection between the start signal line 2a and the upcounting input of counter 12, there may be connected a delay circuit 5 so that the counter 12 only is incremented if the voice detector switch means 2 detects a voice message of a certain length to be recorded on the recording memory means 4.

In the block diagram there is further indicated a line 2b from the voice detector switch means 2 to the recording memory means 4. The voice detector switch means 2 may provide on this line 2b rewind-signals for rewinding the recording memory means, if no message of predetermined length is recorded on the recording memory means 4. In this case, the recording memory means 4 is rewound to a respective starting point so that no tape length is wasted. In this case, this rewindsignal on line 2b may be used to decrement the counter 12. The counter 12 is, in this case, provided with a down-counting input for decrementing the counter and this input is connected to line 2b. In this case, obviously, the delay circuit 5 is not necessary, since this function is integrated in the voice detector switch means.

In both cases set out above, it is ensured that the counter 12 counts only those calls in which an actual message was spoken and recorded by the recording memory.

Since the counters 11, 12, are each formed by two BCD counters, said counters each have eight outputs as indicated in the drawings by two output lines each with four strokes each intended to represent four signal wires. These respective eight outputs of the counters 11, 12 are connected to the inputs of two multiplexers 13, 14 which are each double one-out-of-four multiplexers. Such multiplexers have four inputs, one of which is connected under the control of a selection signal which will be further explained below to the output. The outputs of equal significance of hhe four counter states of the two counters 11, 12 are each connected to the four inputs of a multiplexer so that the four multiplexers together furnish a BCD-coded output signal which is applied via a line likewise comprising four signal wires to a seven segment decoder 15 which furnishes control signals to the segments of the four digits of the digital display 10.

As further illustrated in the drawings the clock pulse source comprising a clock pulse generator 18 and a counter 16 furnishing the selection signals to the multiplexers 13, 14 is provided.

The selection signals which occur at the output of the counter 18 are further applied to a one-out-of-four multiplexer or decoder 17 which in dependence upon the output signals of the counter stages of the counters 11, 12 selected by the multiplexers 13, 14 drives corresponding digits of the digital display 10. In this manner, the output signals of the two counter stages of the counter 11 are always applied to the two right digits 10a, 10b whilst the output signals of the two counter stages of the counter 12 are always applied to the two left digits 10c, 10d because the multiplexers 13, 14 and the decoder 17 are driven synchronously with each other by the counter 16. The clock pulse generator 18 can also be formed by a clock pulse source which is in any case present in the answering set.

The digits 10b and 10d always represent the highest order digit of the number of calls and recorded messages respectively whilst the digits 10a and 10c indicate the lowest-order digit of this number.

The two counters 11, 12 can be reset by a reset signal to zero and this signal is generated when the recording memory is erased after being listened to.

All the circuits of the block circuit diagram, i.e. the counters 11, 12, the multiplexers13, 14, and the decoders 15, 17 and the clock pulse source 16, 18 can be combined with each other in the form of a single circuit which may even have the form of an integrated circuit and is connected to the four-digit digital display so that a compact constructional unit results which can be inserted in the answering set independently of other parts.

We claim:

1. A telephone message recording device for recording messages from a caller on an incoming telephone line, comprising recording memory means for recording of calls and incoming messages, announcemnet memory means, detector means responsive to incoming telephone calls and producing a start signal for said announcement memory means, the announcement memory means including means providing a pre-recorded message to the caller responsive to the start signal, voice detector switch means fox detecting whether there are voice signals on the incoming line and supplying a start signal to said recording memory means, first and second counters, display means for indicating that a call or calls have been received, the display means including first and second numeric display means, of which the first display means is responsive to said first counter and indicates the number of calls received and the second display means is responsive to said second counter and indicates the number of calls which have been recorded on the recording memory means, the first and second counters each being formed by two-digit BCD counters whose output signals are applied via multiplexers and drive circuits to a digital display, said multiplexers being each formed by two one-out-of- four-multiplexers, means coupling the inputs of a respective one-out-of-four-multiplexer to the corresponding outputs of the two two-digit counters, means connecting the outputs of the four one-out-of-four-multiplexers to the four inputs of a seven segment decoder which controls the segments of the four-digit digital display, means connecting the selection control inputs of the multiplexers to output lines of a clock pulse source having two outputs further connected to a decoder for selecting the respective digit of the four-digit digital display.

2. A telephone message recording device as defined in claim 1, wherein said first counter controls said first numeric display means and counts the start signals from the announcement memory means and said second counter controls the second display means and counts the start signals from the recording memory means, said first and second counters having reset inputs, and said recording means including means responsive to an erase command signal for erasing message recorded therein.

* * * * *